US012761516B2

(12) United States Patent
Zhao et al.

(10) Patent No.: US 12,761,516 B2
(45) Date of Patent: Oct. 13, 2026

(54) LIQUID CRYSTAL DISPLAY DEVICE

(71) Applicant: TCL China Star Optoelectronics Technology Co., Ltd., Shenzhen (CN)

(72) Inventors: Jun Zhao, Shenzhen (CN); Bin Zhao, Shenzhen (CN); Peng Du, Shenzhen (CN); Chungching Hsieh, Shenzhen (CN); Hongyuan Xu, Shenzhen (CN); Jing Liu, Shenzhen (CN); Haiyun Wang, Shenzhen (CN); Qinsheng Chen, Shenzhen (CN)

(73) Assignee: Shenzhen TCL New Technology co., LTD., Shenzhen (CN)

( * ) Notice: Subject to any disclaimer, the term of this patent is extended or adjusted under 35 U.S.C. 154(b) by 149 days.

(21) Appl. No.: 18/929,793

(22) Filed: Oct. 29, 2024

(65) Prior Publication Data

US 2026/0072316 A1 Mar. 12, 2026

(30) Foreign Application Priority Data

Sep. 6, 2024 (CN) ......................... 202411252074.4

(51) Int. Cl.
*G02F 1/1343* (2006.01)

(52) U.S. Cl.
CPC .. *G02F 1/134309* (2013.01); *G02F 2201/122* (2013.01); *G02F 2201/123* (2013.01); *G02F 2201/52* (2013.01)

(58) Field of Classification Search
CPC ......... G02F 1/134309; G02F 2201/122; G02F 2201/123; G02F 2201/52
See application file for complete search history.

(56) References Cited

U.S. PATENT DOCUMENTS

| | | | | |
|---|---|---|---|---|
| 11,822,188 | B2 * | 11/2023 | Zhang | G02F 1/133707 |
| 2020/0257174 | A1 * | 8/2020 | Cao | G02F 1/134336 |
| 2021/0302791 | A1 * | 9/2021 | Um | G02F 1/134309 |
| 2021/0364865 | A1 * | 11/2021 | Cao | G02F 1/134327 |
| 2023/0032811 | A1 * | 2/2023 | Chen | G02F 1/134309 |

* cited by examiner

*Primary Examiner* — Anne M Hines

(57) ABSTRACT

The present disclosure provides a liquid crystal display device where a width of each of the branch electrodes of one of the main pixel electrode and the secondary pixel electrode of each of the blue pixel units is less than the width of the each of the branch electrodes of the one of the main pixel electrode and the secondary pixel electrode of the each of the red pixel units and the green pixel units, and a width of each of the branch electrodes of another of the main pixel electrode and the secondary pixel electrode of each of the blue pixel units is less than the width of the each of the branch electrodes of the another of the main pixel electrode and the secondary pixel electrode of the each of the red pixel units and the green pixel units.

20 Claims, 4 Drawing Sheets

LIQUID CRYSTAL DISPLAY DEVICE

CROSS-REFERENCE TO RELATED APPLICATION

This application claims the benefit of priority of Chinese Patent Application No. 202411252074.4 filed on Sep. 6, 2024, the contents of which are incorporated by reference as if fully set forth herein in their entirety.

TECHNICAL FIELD

The present disclosure relates to the field of display technologies, and more particularly to a liquid crystal display device.

BACKGROUND

Pixel electrodes of three types of pixel units, i.e., red, green, and blue pixel units, generally use the same design parameters in a pixel design of a conventional liquid crystal display device (LCD). Specifically, a width of each of the branch electrodes of each of the pixel electrodes and a gap width between adjacent branch electrodes tend to be uniform among the red, green, and blue pixel units.

According to gamma curve analysis of the red, green and blue pixel units in a front view angle and a side view angle, there is a problem in the conventional liquid crystal display device that side view gamma values of the blue pixel unit at low and medium gray scales are generally higher than those of the red and green pixel units; and a side view angle gamma value of the blue pixel unit at a high gray scale is lower than those of the red and green pixel units. This difference results in color distortion of the display in different view angles, in particular more obvious when viewed in a side view angle.

Therefore, a new technical solution is urgently needed to effectively balance display characteristics of the three pixel units at different view angles, and to improve the overall display quality and view angle characteristics of a liquid crystal display device in a vertical alignment (VA) mode.

SUMMARY

Embodiments of the present disclosure provide a liquid crystal display device, which is to improve overall view angle characteristics.

Embodiments of the present disclosure provide a liquid crystal display device, including: a plurality of pixel units including red pixel units, green pixel units, and blue pixel units; where each of the red pixel units, the green pixel units, and the blue pixel units includes a main pixel electrode and a secondary pixel electrode, and the main pixel electrode and the secondary pixel electrode both include a plurality of branch electrodes; a width of each of the branch electrodes of one of the main pixel electrode and the secondary pixel electrode of each of the red pixel units and the green pixel units is less than a width of each of the branch electrodes of another of the main pixel electrode and the secondary pixel electrode of the each of the red pixel units and the green pixel units; and a width of each of the branch electrodes of one of the main pixel electrode and the secondary pixel electrode of each of the blue pixel units is less than the width of the each of the branch electrodes of the one of the main pixel electrode and the secondary pixel electrode of the each of the red pixel units and the green pixel units, and a width of each of the branch electrodes of another of the main pixel electrode and the secondary pixel electrode of each of the blue pixel units is less than the width of the each of the branch electrodes of the another of the main pixel electrode and the secondary pixel electrode of the each of the red pixel units and the green pixel units.

In the liquid crystal display device, a gap width between adjacent ones of the branch electrodes of one of the main pixel electrode and the secondary pixel electrode of each of the red pixel units is greater than a gap width between adjacent ones of the branch electrodes of another of the main pixel electrode and the secondary pixel electrode of the each of the red pixel units; and a gap width between adjacent ones of the branch electrodes of one of the main pixel electrode and the secondary pixel electrode of each of the green pixel units is greater than a gap width between adjacent ones of the branch electrodes of another of the main pixel electrode and the secondary pixel electrode of the each of the green pixel units.

In the liquid crystal display device, a gap width between adjacent ones of the branch electrodes of the one of the main pixel electrode and the secondary pixel electrode of the each of the blue pixel units is greater than a gap width between adjacent ones of the branch electrodes of the one of the main pixel electrode and the secondary pixel electrode of the each of the red pixel units and the green pixel units.

In the liquid crystal display device, a gap width between adjacent ones of the branch electrodes of the another of the main pixel electrode and the secondary pixel electrode of the each of the blue pixel units is greater than a gap width between adjacent ones of the branch electrodes of the another of the main pixel electrode and the secondary pixel electrode of the each of the red pixel units and the green pixel units.

In the liquid crystal display device, a ratio of the width of the each of the branch electrodes of the one of the main pixel electrode and the secondary pixel electrode of the each of the red pixel units and the green pixel units to the gap width between the adjacent branch electrodes of the one of the main pixel electrode and the secondary pixel electrode of the each of the red pixel units and the green pixel units is in the range of 1.1:1 to 1.3:1.

In the liquid crystal display device, a ratio of the width of the each of the branch electrodes of the one of the main pixel electrode and the secondary pixel electrode of the each of the red pixel units and the green pixel units to the gap width between the adjacent branch electrodes of the one of the main pixel electrode and the secondary pixel electrode of the each of the red pixel units and the green pixel units is 3.3:2.7.

In the liquid crystal display device, a ratio of the width of the each of the branch electrodes of the one of the main pixel electrode and the secondary pixel electrode of the each of the blue pixel units to the gap width between the adjacent branch electrodes of the one of the main pixel electrode and the secondary pixel electrode of the each of the blue pixel units is in the range of 1:1.1 to 1:1.3.

In the liquid crystal display device, a ratio of the width of the each of the branch electrodes of the one of the main pixel electrode and the secondary pixel electrode of the each of the blue pixel units to the gap width between the adjacent branch electrodes of the one of the main pixel electrode and the secondary pixel electrode of the each of the blue pixel units is 2.7:3.3.

In the liquid crystal display device, a ratio of the width of the each of the branch electrodes of the another of the main pixel electrode and the secondary pixel electrode of the each of the red pixel units and the green pixel units to the gap width between the adjacent branch electrodes of the another of the main pixel electrode and the secondary pixel electrode of the each of the red pixel units and the green pixel units is in the range of 1.5:1 to 1.7:1.

In the liquid crystal display device, a ratio of the width of the each of the branch electrodes of the another of the main pixel electrode and the secondary pixel electrode of the each of the red pixel units and the green pixel units to the gap width between the adjacent branch electrodes of the another of the main pixel electrode and the secondary pixel electrode of the each of the red pixel units and the green pixel units is 3.7:2.3.

In the liquid crystal display device, a ratio of the width of the each of the branch electrodes of the another of the main pixel electrode and the secondary pixel electrode of the each of the blue pixel units to the gap width between the adjacent branch electrodes of the another of the main pixel electrode and the secondary pixel electrode of the each of the blue pixel units is in the range of 1:1 to 1:1.

In the liquid crystal display device, a ratio of the width of the each of the branch electrodes of the another of the main pixel electrode and the secondary pixel electrode of the each of the blue pixel units to the gap width between the adjacent branch electrodes of the another of the main pixel electrode and the secondary pixel electrode of the each of the blue pixel units is 3.1:2.9.

In the liquid crystal display device provided in the embodiments of the present disclosure, the width of each of the branch electrodes of each of the main pixel electrode and the secondary pixel electrode of the each of the red pixel units and the green pixel units and the gap width between the adjacent ones of the branch electrodes of each of the main pixel electrode and the secondary pixel electrode of the each of the red pixel units and the green pixel units, the main pixel electrode, and the secondary pixel electrode are differentially designed, so that the main pixel electrode adopts narrower branch electrodes and a wider gap between the adjacent branch electrodes, and the secondary pixel electrode adopts wider branch electrodes and a narrower gap between the adjacent branch electrodes, and the width of the each of the branch electrodes of each of the main pixel electrode and the secondary pixel electrode of each of the blue pixel units is less than the width of each of the branch electrodes of each of the main pixel electrode and the secondary pixel electrode of the each of the red pixel units and the green pixel units, and the gap width between adjacent ones of the branch electrodes of each of the main pixel electrode and the secondary pixel electrode of each of the blue pixel units is greater than the gap width between adjacent ones of the branch electrodes of each of the main pixel electrode and the secondary pixel electrode of the each of the red pixel units and the green pixel units. Therefore, the liquid crystal display device of the present disclosure can effectively reduce and enable the side view angle gamma value of each of the blue pixel units to be closer to those of the red pixel units and the green pixel units, thereby improving the coincidence degree of the side view angle gamma values of the blue pixel units, the red pixel units, and the green pixel units and further the overall view angle characteristics. Additionally, the liquid crystal display device of the present disclosure can significantly improve the display effect under the side view angle, in particular to suppress the blue shift while maintaining good front view angle display quality.

DETAILED DESCRIPTION

Figure 1:
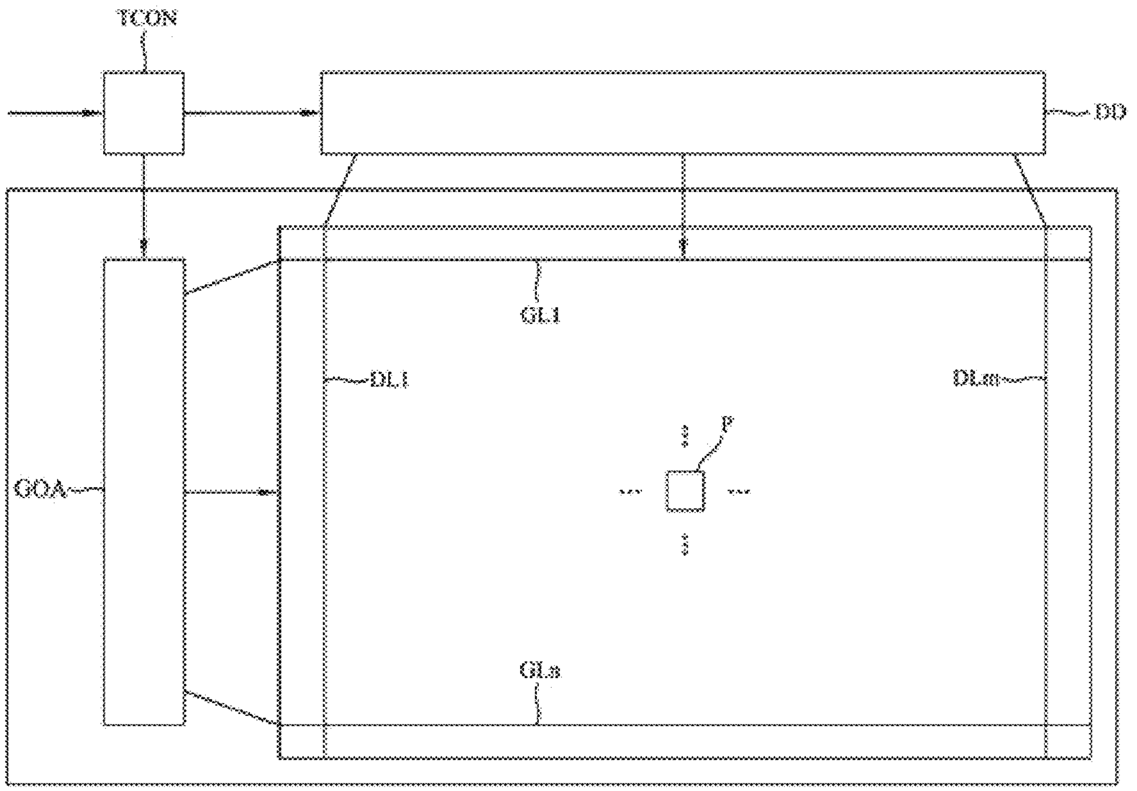
FIG. 1 is a schematic diagram of a liquid crystal display device according to some embodiments of the present disclosure.

Specific embodiments of the present disclosure are described in detail below with reference to the accompanying drawings.

The terms "first", "second", and the like do not denote any order, number, or importance, but are used merely to distinguish between different technical features. The terms "plurality" and the like denote two or more, unless defined otherwise.

In a conventional liquid crystal display device in a vertical alignment display mode, the width of the each of the branch electrodes of each of the main pixel electrode and the secondary pixel electrode of the each of the red pixel units, the green pixel units, and the blue pixel units and the gap width between adjacent branch electrodes of the each of the main pixel electrode and the secondary pixel electrode of the each of the red pixel units, the green pixel units, and the blue pixel units are generally the same. However, there may be a difference in the display effects of the red, green, and blue pixel units in the front and side view angles due to reverse characteristics of the liquid crystal and a difference in red, green, and blue wavelengths. In particular, the side view angle gamma values of the blue pixel units in the low and medium gray scale ranges are generally higher than those of the red and green pixel units, while the side view angle gamma values of the blue pixel units in the high gray scale range are lower than those of the red and green pixel units. This difference results in color distortion of the display in different view angles, in particular more obvious when viewed in a side view angle.

To solve the above technical problems, the embodiments of the present disclosure provide following technical solutions: for the each of the red pixel units and the green pixel units, the width of each of the branch electrodes of each of the main pixel electrode and the secondary pixel electrode and the gap width between the adjacent ones of the branch electrodes of each of the main pixel electrode and the secondary pixel electrode are differentially designed, for example, the main pixel electrode adopts narrower branch electrodes and a wider gap between the adjacent branch electrodes, and the secondary pixel electrode adopts wider branch electrodes and a narrower gap between the adjacent branch electrodes; and for each of the blue pixel units, the width of the each of the branch electrodes of each of the main pixel electrode and the secondary pixel electrode is less than the width of each of the branch electrodes of each of the main pixel electrode and the secondary pixel electrode of the each of the red pixel units and the green pixel units, and the gap width between adjacent ones of the branch electrodes of each of the main pixel electrode and the secondary pixel electrode is greater than the gap width between adjacent ones of the branch electrodes of each of the main pixel electrode and the secondary pixel electrode of the each of the red pixel units and the green pixel units.

Therefore, the liquid crystal display device of the present disclosure can effectively reduce and enable the side view angle gamma value of each of the blue pixel units to be closer to those of the red pixel units and the green pixel units, thereby improving the coincidence degree of the side view angle gamma values of the blue pixel units, the red pixel units, and the green pixel units and further the overall view angle characteristics. Additionally, the liquid crystal display device of the present disclosure can significantly improve the display effect under the side view angle, in particular to suppress the blue shift while maintaining good front view angle display quality.

As shown in FIG. 1, a liquid crystal display device provided in an embodiment of the present disclosure may include a liquid crystal display panel, a timing controller TCON, a source driving circuit DD, and a power management chip (not shown), where the power management chip may be integrated into the same chip as the timing controller TCON. The liquid crystal display panel may include a plurality of pixel units P, a plurality of scan lines (GL1~GLn), a plurality of data lines (DL1~DLm), a gate driving circuit GOA, and the like. The plurality of pixel units P may be arranged in rows and columns, the gate driving circuit GOA may be electrically connected to the plurality of scan lines (GL1~GLn), the source driving circuit DD may be electrically connected to the plurality of data lines (DL1~DLm), the scan lines (GL1~GLn) and the data lines (DL1~DLm) may be electrically connected to the pixel units P, and the timing controller TCON may be electrically connected to the gate driving circuit GOA and the source driving circuit DD.

The liquid crystal display panel may include a thin film transistor array substrate, an opposite substrate, and a liquid crystal material disposed between the thin film transistor array substrate and the opposite substrate. The thin film transistor array substrate may include a base substrate, a gate driving circuit GOA, pixel units P, scan lines (GL1~GLn), data lines (DL1~DLm), color resists, and the like. Each of the pixel units P may include a thin film transistor, a pixel electrode, and the like. The thin film transistor may be electrically connected to the pixel electrode, the scan lines (GL1~GLn), and the data lines (DL1~DLm).

The gate driving circuit GOA may include cascaded multistage gate driving units, where each stage gate driving unit of the multistage gate driving units is electrically connected to a row of pixel units P for supplying a scan signal to the pixel units P.

The source driving circuit DD may be configured to supply a data signal to the pixel units P.

The timing controller TCON may be configured to receive externally input image data, and control the gate driving circuit GOA to output the scan signal, and control the source driving circuit DD to output the data signal.

The power management chip may be configured to supply required operation voltages to various portions of the liquid crystal display device.

Figure 2:
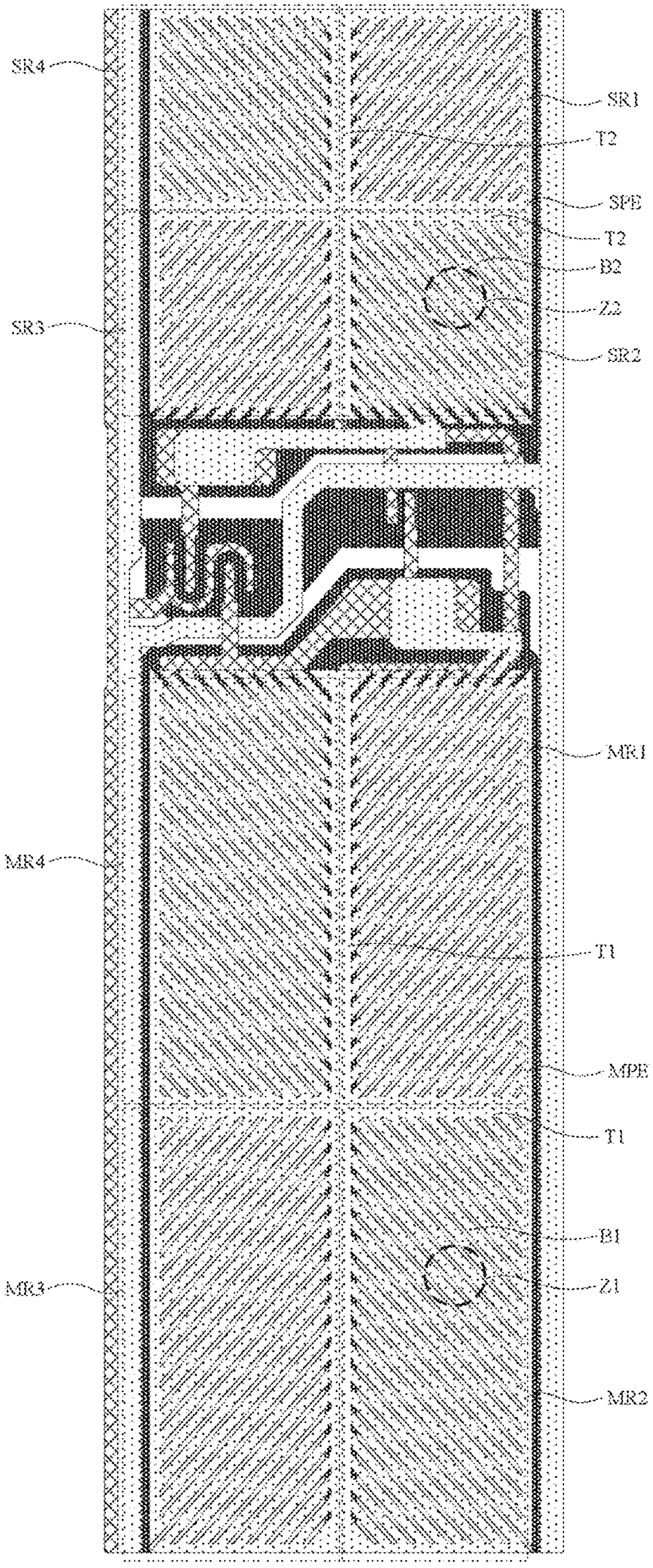
FIG. 2 is a schematic diagram of a pixel unit of the liquid crystal display device shown in FIG. 1.
Figure 3:
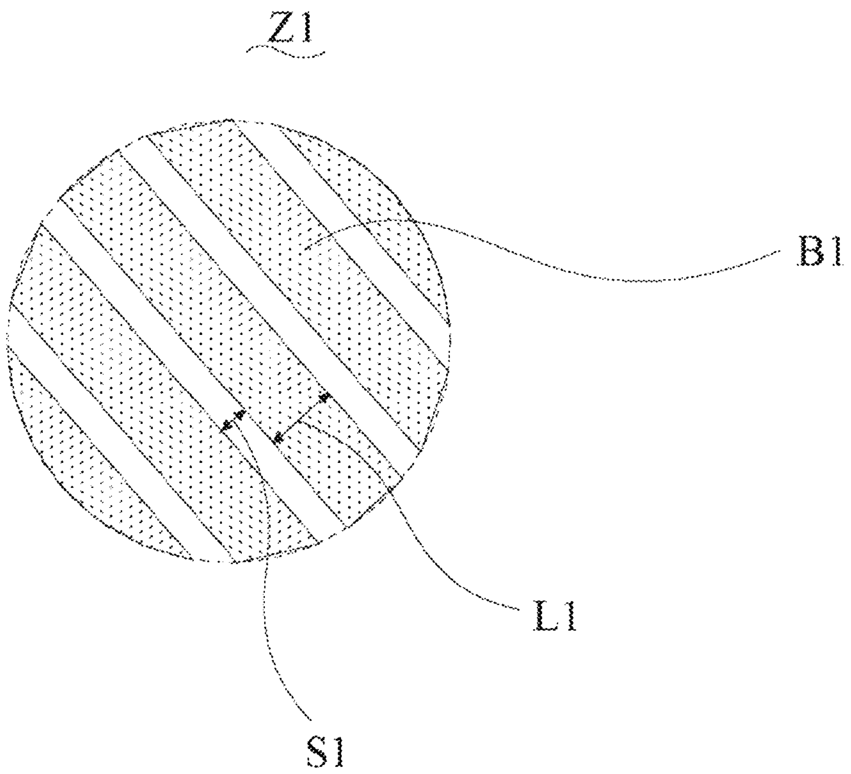
FIG. 3 is a partially enlarged view of a region Z1 in FIG. 2.
Figure 4:
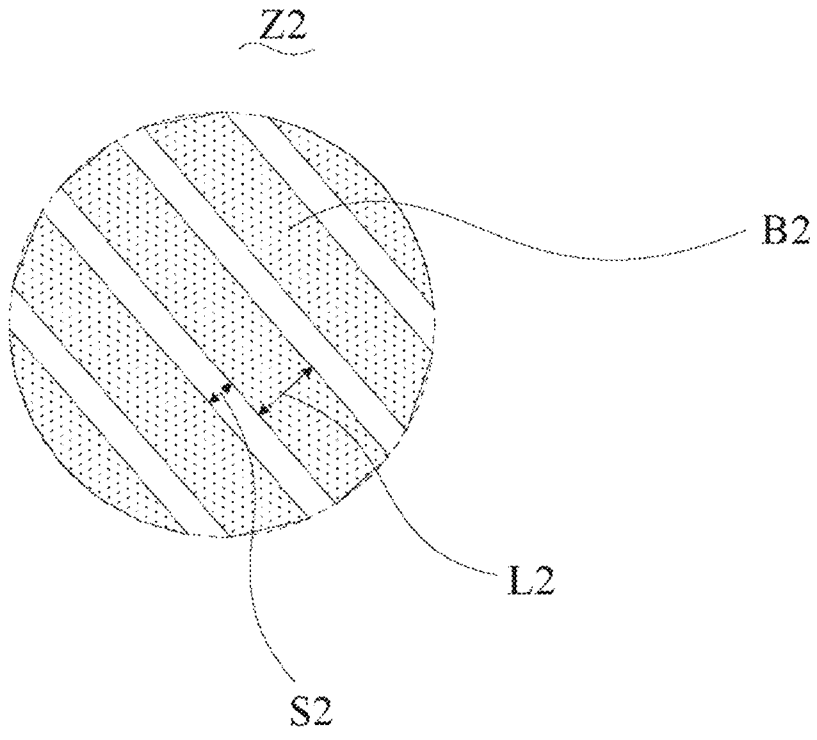
FIG. 4 is a partially enlarged view of a region Z2 in FIG. 2.

A liquid crystal display device according to some embodiments of the present disclosure may include a plurality of pixel units including red pixel units, green pixel units, and blue pixel units. As shown in FIGS. 2, 3, and 4, each of the red pixel units, the green pixel units, and the blue pixel units may include a main pixel electrode MPE and a secondary pixel electrode SPE, where each of the main pixel electrode MPE and the secondary pixel electrode SPE includes four regions (commonly referred to as a domain or Domain), the four regions include a first region (MR1, SR1), a second region (MR2, SR2), a third region (MR3, SR3), and a fourth region (MR4, SR4) arranged in a clockwise direction, and each of the main pixel electrode MPE and the secondary pixel electrode SPE includes a plurality of branch electrodes (B1, B2). A width (L1, L2) of each of the branch electrodes (B1, B2) of one of the main pixel electrode MPE and the secondary pixel electrode SPE of each of the red pixel units and the green pixel units is less than a width (L1, L2) of each of the branch electrodes of another of the main pixel electrode MPE and the secondary pixel electrode SPE of the each of the red pixel units and the green pixel units. A width (L1, L2) of each of the branch electrodes (B1, B2) of one of the main pixel electrode MPE and the secondary pixel electrode SPE of each of the blue pixel units is less than the width (L1, L2) of the each of the branch electrodes (B1, B2) of the one of the main pixel electrode MPE and the secondary pixel electrode SPE of the each of the red pixel units and the green pixel units, and a width (L1, L2) of each of the branch electrodes (B1, B2) of another of the main pixel electrode MPE and the secondary pixel electrode SPE of the each of the blue pixel units is less than the width (L1, L2) of the each of the branch electrodes (B1, B2) of the another of the main pixel electrode MPE and the secondary pixel electrode SPE of the each of the red pixel units and the green pixel units.

For each of the red pixel units and the green pixel units, the width (L1, L2) of each of the branch electrodes (B1, B2) of the main pixel electrode MPE is different from that of each of the branch electrodes (B1, B2) of the secondary pixel electrode SPE. For example, the main pixel electrode MPE has narrower branch electrodes (B1, B2) and the secondary pixel electrode SPE has wider branch electrodes (B1, B2). As a result, the display effect in the full gray scale range can be optimized.

For each of the blue pixel units, the width (L1, L2) of each of the branch electrodes (B1, B2) of each of the main pixel electrode MPE and the secondary pixel electrode SPE is less than the width (L1, L2) of each of the branch electrodes (B1, B2) of each of the main pixel electrode MPE and the secondary pixel electrode SPE of each of the red pixel units and the green pixel units. A range of a tilt angle of each of liquid crystal molecules can be increased by reducing the width (L1, L2) of each of the branch electrodes (B1, B2) of each of the main pixel electrode MPE and the secondary pixel electrode SPE of each of the blue pixel units, which effectively suppresses a blue shift common in the conventional liquid crystal display at the side view angle, and achieves a better display effect at the side view angle.

The liquid crystal display device provided according to the present embodiment may differentiate the width (L1, L2) of each of the branch electrodes (B1, B2) of the main pixel electrode and the width (L1, L2) of each of the branch electrodes (B1, B2) of the secondary pixel electrode, and realize reduction of the gamma value at the side view angles of the red, green and blue pixel units in the low gray scale range and increase of the red and green gamma values and reduction of the blue gamma value in the medium gray scale range by using alignment differences of the liquid crystal molecules at different electrode widths, thereby improving the display effect at different gray scales and view angles.

Specifically, for each of the red and green pixel units, the width (L1, L2) of each of the branch electrodes (B1, B2) of the main pixel electrode MPE is less than the width (L1, L2) of each of the branch electrodes (B1, B2) of the secondary pixel electrode SPE, so that down-shift of the gamma values in the low gray scale range can be better controlled. Additionally, the wider branch electrodes (B1, B2) of the secondary pixel electrode SPE advantageously control the up-shift of the gamma values in the medium gray scale range. For each of the blue pixel units, the width (L1, L2) of each of the branch electrodes (B1, B2) of each of the main pixel electrode MPE and the secondary pixel electrode SPE is both less than the width of each of the branch electrodes (B1, B2) of each of the main pixel electrode MPE and the secondary pixel electrode SPE of each of the red pixel units and the green pixel units, so as to effectively reduce and make the gamma values of the blue pixels in the low gray scale range and the medium gray scale range be closer to those of the red and green pixels, thereby improving the color uniformity at the side view angle. The liquid crystal display device of the present embodiments effectively suppresses a blue shift common in the conventional liquid crystal display at the side view angle.

For each of the red and green pixel units, the width (L1, L2) of each of the branch electrodes (B1, B2) of the main pixel electrode MPE is less than the width (L1, L2) of each of the branch electrodes (B1, B2) of the secondary pixel electrode SPE, so that the main pixel electrode MPE can have a higher electric field sensitivity in the low gray scale range to facilitate the control of the display brightness in the low gray scale range, and the wider branch electrodes (B1, B2) of the secondary pixel electrode SPE can provide a higher brightness output in the medium gray scale range.

For each of the blue pixel units, the width (L1, L2) of each of the branch electrodes (B1, B2) of each of the main pixel electrode MPE and the secondary pixel electrode SPE is less than the width of each of the branch electrodes (B1, B2) of each of the main pixel electrode MPE and the secondary pixel electrode SPE of each of the red pixel units and the green pixel units, so that the brightness of the blue pixel in the low gray scale range and the medium gray scale range can be reduced to be closer to the brightness levels of the red and green pixel units.

A gap width (S1, S2) between adjacent ones of the branch electrodes (B1, B2) of one of the main pixel electrode MPE and the secondary pixel electrode SPE of each of the red pixel units is greater than a gap width (S1, S2) between adjacent ones of the branch electrodes (B1, B2) of another of the main pixel electrode MPE and the secondary pixel electrode SPE of the each of the red pixel units; and a gap width (S1, S2) between adjacent ones of the branch electrodes (B1, B2) of one of the main pixel electrode MPE and the secondary pixel electrode SPE of each of the green pixel units is greater than a gap width (S1, S2) between adjacent ones of the branch electrodes (B1, B2) of another of the main pixel electrode MPE and the secondary pixel electrode SPE of the each of the green pixel units.

A gap width (S1, S2) between adjacent ones of the branch electrodes (B1, B2) of one of the main pixel electrode MPE and the secondary pixel electrode SPE of each of the blue pixel units is greater than a gap width (S1, S2) between adjacent ones of the branch electrodes (B1, B2) of one of the main pixel electrode MPE and the secondary pixel electrode SPE of the each of the red pixel units and the green pixel units.

A gap width (S1, S2) between adjacent ones of the branch electrodes (B1, B2) of another of the main pixel electrode MPE and the secondary pixel electrode SPE of each of the blue pixel units is greater than a gap width (S1, S2) between adjacent ones of the branch electrodes (B1, B2) of another of the main pixel electrode MPE and the secondary pixel electrode SPE of the each of the red pixel units and the green pixel units.

For each of the red and green pixel units, the gap width (S1, S2) between adjacent ones of the branch electrodes (B1, B2) of the main pixel electrode MPE is different from the gap width (S1, S2) between adjacent ones of the branch electrodes (B1, B2) of the secondary pixel electrode SPE. For example, the gap between the adjacent branch electrodes (B1, B2) of the main pixel electrode MPE is wider, while the gap between the adjacent branch electrodes (B1, B2) of the secondary pixel electrode SPE is narrower. This enables the main pixel electrode MPE to generate a more uniform weak electric field in the low gray scale range, thereby facilitating slow inversion of the liquid crystal molecules to achieve a finer low gray scale control. The narrower gap of the secondary pixel electrode SPE facilitates generation of a stronger electric field in the high gray scale range to ensures that the liquid crystal molecules can rapidly reach a desired alignment state.

For each of the blue pixel units, the gap width (S1, S2) between adjacent ones of the branch electrodes (B1, B2) of either the main pixel electrode MPE or the secondary pixel electrode SPE is greater than a gap width (S1, S2) between adjacent ones of the branch electrodes (B1, B2) of respective main pixel electrode MPE or secondary pixel electrode SPE of the each of the red pixel units and the green pixel units. Atilt angle of the liquid crystal molecules can be made smaller by increasing the gap between adjacent ones of the branch electrodes (B1, B2) of each of the main pixel electrode MPE and the secondary pixel electrode SPE of each of the blue pixel units to generate a weaker electric field at the same driving voltage, which helps to reduce light leakage at the side view angle and improves the color uniformity at the side view angle. Additionally, the larger gap allows more light to be transmitted, compensating to some extent for the inherent low transmittance of the blue sub-pixels.

The liquid crystal display device provided according to the present embodiment may differentiate the gap width (S1, S2) between adjacent ones of the branch electrodes (B1, B2) of the main pixel electrode and the gap width (L1, L2) between adjacent ones of the branch electrodes (B1, B2) of the secondary pixel electrode, and realize reduction of the gamma value at the side view angles of the red, green and blue pixel units in the low gray scale range and increase of the red and green gamma values and reduction of the blue gamma value in the medium gray scale range by using alignment differences of the liquid crystal molecules at different gap widths, thereby improving the display effect at different gray scales and view angles. For each of the red pixel units and the green pixel units, the gap width (S1, S2) between adjacent ones of the branch electrodes (B1, B2) of the main pixel electrode MPE is greater than the gap width (S1, S2) between adjacent ones of the branch electrodes (B1, B2) of the secondary pixel electrode SPE, so that the main pixel electrode MPE generates a more uniform weak electric field in the low gray scale range, thereby facilitating slow inversion of the liquid crystal molecules to achieve a finer low gray scale control. Additionally, the narrower gap of the secondary pixel electrode SPE facilitates generation of a stronger electric field in the high gray scale range to ensures that the liquid crystal molecules can rapidly reach a desired alignment state. For each of the blue pixel units, the gap width (S1, S2) between adjacent ones of the branch electrodes (B1, B2) of each of the main pixel electrode MPE and the secondary pixel electrode SPE are both greater than the gap width between adjacent ones of the branch electrodes (B1, B2) of each of the main pixel electrode MPE and the secondary pixel electrode SPE of each of the red pixel units and the green pixel units, so as to effectively reduce and make the gamma values of the blue pixels in the low gray scale range and the medium gray scale range be closer to those of the red and green pixels, thereby improving the color uniformity at the side view angle.

A ratio of the width (L1, L2) of the each of the branch electrode (B1, B2) of the one of the main pixel electrode MPE and the secondary pixel electrode SPE of the each of the red pixel units and the green pixel units to the gap width (S1, S2) between the adjacent branch electrodes (B1, B2) of the one of the main pixel electrode MPE and the secondary pixel electrode SPE of the each of the red pixel units and the green pixel units is in the range of 1.1:1 to 1.3:1.

Alternatively, a ratio of the width (L1, L2) of the each of the branch electrodes (B1, B2) of the one of the main pixel electrode MPE and the secondary pixel electrode SPE of the each of the red pixel units and the green pixel units to the gap width (S1, S2) between the adjacent branch electrodes (B1, B2) of the one of the main pixel electrode MPE and the secondary pixel electrode SPE of the each of the red pixel units and the green pixel units is 3.3:2.7.

A ratio of the width (L1, L2) of the each of the branch electrodes (B1, B2) of the one of the main pixel electrode MPE and the secondary pixel electrode SPE of the each of the blue pixel units to the gap width (S1, S2) between the adjacent branch electrodes (B1, B2) of the one of the main pixel electrode MPE and the secondary pixel electrode SPE of the each of the blue pixel units is in the range of 1:1.1 to 1:1.3.

Alternatively, a ratio of the width (L1, L2) of the each of the branch electrodes (B1, B2) of the one of the main pixel electrode MPE and the secondary pixel electrode SPE of the each of the blue pixel units to the gap width (S1, S2) between the adjacent branch electrodes (B1, B2) of the one of the main pixel electrode MPE and the secondary pixel electrode SPE of the each of the blue pixel units is 2.7:3.3.

A ratio of the width (L1, L2) of the each of the branch electrodes (B1, B2) of the another of the main pixel electrode MPE and the secondary pixel electrode SPE of the each of the red pixel units and the green pixel units to the gap width (S1, S2) between the adjacent branch electrodes (B1, B2) of the another of the main pixel electrode MPE and the secondary pixel electrode SPE of the each of the red pixel units and the green pixel units is in the range of 1.5:1 to 1.7:1.

Alternatively, a ratio of the width (L1, L2) of the each of the branch electrodes (B1, B2) of the another of the main pixel electrode MPE and the secondary pixel electrode SPE of the each of the red pixel units and the green pixel units to the gap width (S1, S2) between the adjacent branch electrodes (B1, B2) of the another of the main pixel electrode MPE and the secondary pixel electrode SPE of the each of the red pixel units and the green pixel units is 3.7:2.3.

A ratio of the width (L1, L2) of the each of the branch electrodes (B1, B2) of the another of the main pixel electrode MPE and the secondary pixel electrode SPE of the each of the blue pixel units to the gap width between the adjacent branch electrodes of the another of the main pixel electrode MPE and the secondary pixel electrode SPE of the each of the blue pixel units is in the range of 1:1 to 1:1.

Alternatively, a ratio of the width (L1, L2) of the each of the branch electrodes (B1, B2) of the another of the main pixel electrode MPE and the secondary pixel electrode SPE of the each of the blue pixel units to the gap width between the adjacent branch electrodes of the another of the main pixel electrode MPE and the secondary pixel electrode SPE of the each of the blue pixel units is 3.1:2.9.

The liquid crystal display device provided in the present embodiment includes a driving controller configured to dynamically adjust driving voltages of the main pixel electrode MPE and the secondary pixel electrode SPE according to spatial frequency characteristics and color distribution characteristics of the display content. When the display content includes high frequency details, the driving voltage of the pixel electrode having a narrower gap is increased; and when the display content is uniform colors in a large area, the driving voltage of the pixel electrode having a wide gap is increased.

The driving controller is further configured to adjust the driving voltages of the main pixel electrode MPE and the secondary pixel electrode SPE according to an ambient light intensity. When a low gray scale image is displayed at a low ambient light intensity, the driving controller boosts the driving voltage of the electrode structure with a wider gap, and when a high contrast image is displayed at a high ambient light intensity, the driving controller boosts the driving voltage of the electrode structure with a narrower gap.

When the low gray scale content is displayed, the driving controller is further configured to apply a higher driving voltage to a pixel electrode of each of the red pixel units and the green pixel units having a ratio of the width (L1, L2) of each of the branch electrodes (B1, B2) thereof to the gap width (S1, S2) between the adjacent ones of the branch electrodes (B1, B2) thereof being 1.1:1 to 1.3:1, i.e., a pixel electrode including the narrower branch electrodes (B1, B2), such as the main pixel electrode MPE of each of the red pixel units and the green pixel units and the main pixel electrode and the secondary pixel electrode of the blue pixel units; and apply a lower driving voltage to a pixel electrode of each of the red pixel units and the green pixel units having a ratio of the width (L1, L2) of each of the branch electrodes (B1, B2) thereof to the gap width (S1, S2) between the adjacent ones of the branch electrodes (B1, B2) thereof being 1.5:1 to 1.7:1, i.e., a pixel electrode including the wider branch electrodes (B1, B2), such as the secondary pixel electrode SPE of each of the red pixel units and the green pixel units. On the contrary, when the medium gray scale content is displayed, a lower driving voltage is applied to the narrower branch electrodes (B1, B2), and a higher driving voltage is applied to the wider branch electrodes (B1, B2).

The driving controller is further configured to reduce the driving voltage of each of the blue pixel units to be lower than the driving voltage of each of the red pixel units and the green pixel units when the medium gray scale content is displayed for the blue pixel unit, so as to compensate for overlighting of the blue pixel in the medium gray scale range.

One of the main pixel electrode MPE or the secondary pixel electrode SPE of each of the red pixel units and the green pixel units employs a width ratio (a ratio of an electrode width to a gap width) of 1.1:1 to 1.3:1, with an optimum value of 3.3:2.7. A uniform electric field can be generated when driven at a low voltage, which facilitates fine control of the low gray scale display.

Another of the main pixel electrode MPE or the secondary pixel electrode SPE of each of the red pixel units and the green pixel units employs a ratio of 1.5:1 to 1.7:1, with an optimum value of 3.7:2.3. A stronger electric field can be generated when driven at a high voltage, which ensures a fast response and facilitates the brightness output of the medium gray scale display.

One of the main pixel electrode MPE or the secondary pixel electrode SPE of each of the blue pixel units employs an inversion ratio of 1:1.1 to 1:1.3, with an optimum value of 2.7:3.3. Another of the main pixel electrode MPE or the secondary pixel electrode SPE of each of the blue pixel units employs a ratio of approximately 1:1, with an optimum value of 3.1:2.9. The above technical solution takes into account a case that the human eye has low sensitivity to blue and that the blue sub-pixels are prone to color skewing at the side view angle. A tilt angle of the liquid crystal molecules can be made smaller by increasing the gap width to generate a weaker electric field at the same driving voltage, which helps to reduce light leakage at the side view angle.

When the low gray scale content is displayed, the brightness of each of the red, green and blue pixel units at the side view angle is moderately reduced, thereby improving view angle characteristics of a dark picture. When the medium gray scale content is displayed, the brightness of each of the red and green pixel units is moderately increased, while the brightness of each of the blue pixel units is relatively decreased, so that the brightness of the three color pixel units is more balanced, thereby improving the color uniformity at the side view angle.

The liquid crystal display device provided according to the present embodiment achieves more accurate display control at different gray scales and view angles, effectively improves the color uniformity at the side view angle, and in particular suppresses the common blue shift at the side view angle, while maintaining high transmittance.

Figure 5:
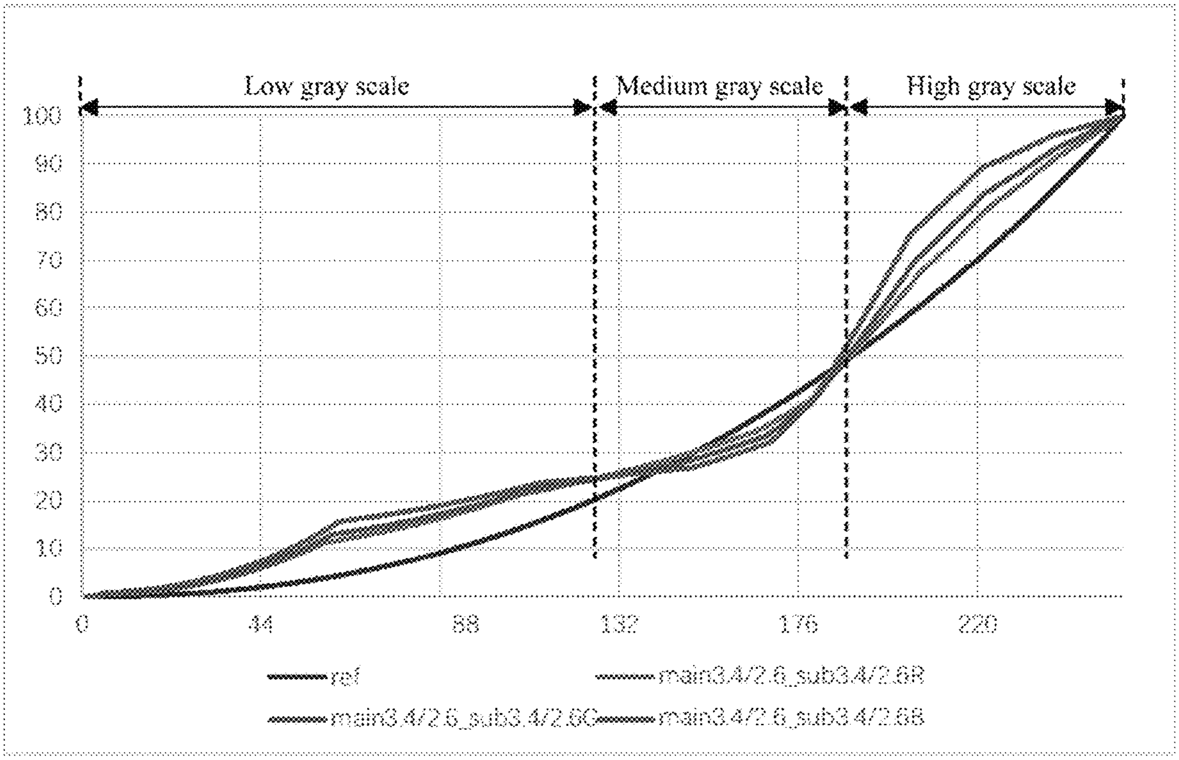
FIG. 5 is a schematic diagram of a gamma curve of a conventional liquid crystal display device in a vertical alignment display mode at different gray scales.
Figure 6:
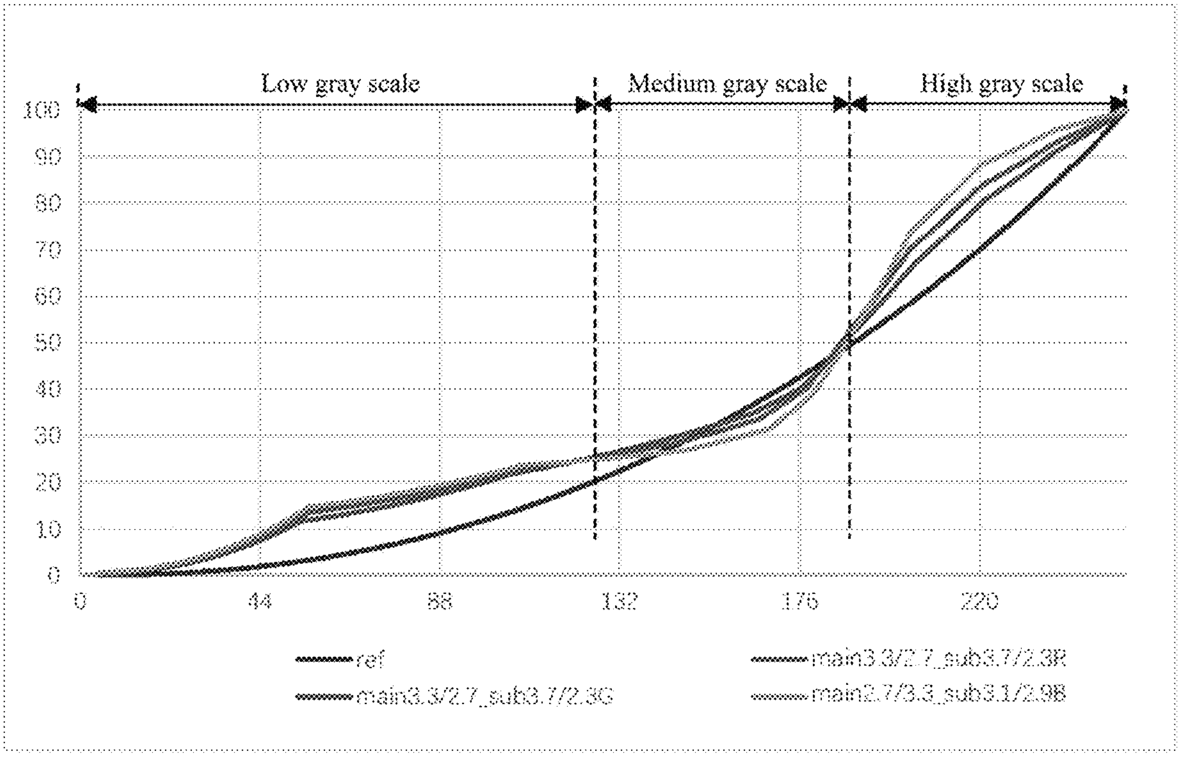
FIG. 6 is a schematic diagram of a gamma curve of the liquid crystal display device of the present disclosure at different gray scales.

As shown in FIGS. 5 and 6, in the embodiment of the present disclosure, for the red, green, and blue pixel units, the gamma curve (ref) in the front view angle better overlaps the gamma curve in the side view angle, and a difference between the gamma curves in the side view angle is also reduced.

TABLE 1

| | Conventional technical solution (as shown in FIG. 5) R G B | Embodiments of the present disclosure (as shown in FIG. 6) R G B | Comparison results |
|---|---|---|---|
| L48 gamma value | 0.30:0.32:0.37 | 0.32:0.34:0.35 | RGB gamma values of embodiments of the present disclosure better overlap in the low gray scale. |
| L155 gamma value | 0.35:0.33:0.32 | 0.36:0.34:0.30 | RG gamma values of embodiments of the present disclosure shift up and B gamma values thereof shift down in the medium gray scale |

In the above Table 1, a gamma value of 48 is taken as an example, and 0.32:0.34:0.35 indicates a ratio of gamma values of red, green, and blue pixel units, which are relatively close and mean that curves of the three values better overlap. Taking a gamma value of 155 as an example, 0.36:0.34:0.30 indicates a ratio of the gamma values of the red, green, and blue pixel units, where the gamma values of the red and green pixel units shift up and the gamma values of the blue pixel units shift down.

TABLE 2

| | Conventional technical solution (as shown in FIG. 5) | Embodiments of the present disclosure (as shown in FIG. 6) |
|---|---|---|
| Main pixel electrode | R: 3.4/2.6<br>G: 3.4/2.6<br>B: 3.4/2.6 | R: 3.3/2.7<br>G: 3.3/2.7<br>B: 2.7/3.3 |
| Secondary pixel electrode | R: 3.4/2.6<br>G: 3.4/2.6<br>B: 3.4/2.6 | R: 3.7/2.3<br>G: 3.7/2.3<br>B: 3.1/2.9 |
| Tr % | 5.06 (ref) | 5.09 |
| Color point | (0.2989, 0.3350) (ref) | (0.3011, 0.3375) |
| ΔUV | 143° | 170.2° |
| CR view angle | 39.47% | 53.72% |
| D 60°/0° | 5.41 | 4.33 |

In addition, it can be seen from Table 2 that the embodiments of the present disclosure have an increase of 0.57% in a penetration rate (Tr %) and an increase of 2% and 2.5% in color points.

In order to optimize alignment of the liquid crystal molecules in the pixel electrodes (the main pixel electrode MPE and the secondary pixel electrode SPE), as an improvement, a side edge and/or a top edge of each of the branch electrodes (B1, B2) are provided with periodic concave-convex portions, so that an alignment layer of a gap region provided between the adjacent branch electrodes (B1, B2) is formed with periodic concave-convex portions. For example, concave-convex portions having a size of 200-300 nm are periodically formed on the side edge and/or the top edge of the each of the branch electrodes (B1, B2) using a nano-imprint lithography, thereby providing additional liquid crystal molecule anchoring points and further optimizing the alignment distribution of the liquid crystal molecules. Meanwhile, a responsive polymer, such as a photosynthesized azobenzene polymer, is deposited in the electrode gap region to adjust the pre-tilt angle of the liquid crystal molecules.

The liquid crystal display device provided in another embodiment of the present disclosure is similar to the liquid crystal display device provided in the previously provided embodiments, except that: in the present embodiment, a width (L1, L2) of the each of the branch electrodes (B1, B2) of each of the main pixel electrode MPE and the secondary pixel electrode SPE of each of the blue pixel units is less than a width (L1, L2) of each of the branch electrodes of respective one of the main pixel electrode MPE and the secondary pixel electrode SPE of the each of the red pixel units and the green pixel units. Specifically, the width (L1, L2) of each of the branch electrodes (B1, B2) of each of the pixel electrodes in each of the blue pixel units is less than the width (L1, L2) of each of the branch electrodes (B1, B2) of respective one of the pixel electrodes in each of the red pixel units and the green pixel units by 0.25 to 0.55 microns, e.g., 0.25 microns, 0.26 microns, 0.27 microns, 0.28 microns, 0.29 microns, 0.30 microns, 0.31 microns, 0.32 microns, 0.33 microns, 0.34 microns, 0.35 microns, 0.36 microns, 0.37 microns, 0.38 microns, 0.39 microns, 0.40 microns, 0.41 microns, 0.42 microns, 0.43 microns, 0.44 microns, 0.45 microns, 0.46 microns, 0.47 microns, 0.48 microns, 0.49 microns, 0.50 microns, 0.51 microns, 0.52 microns, 0.53 microns, 0.54 microns, or 0.55 microns. Alternatively, the width (L1, L2) of each of the branch electrodes (B1, B2) of each of the pixel electrodes in each of the blue pixel units is less than the width (L1, L2) of each of the branch electrodes (B1, B2) of respective one of the pixel electrodes in each of the red pixel units and the green pixel units by 0.4 microns.

Meanwhile, the gap width (S1, S2) between adjacent ones of the branch electrodes (B1, B2) of each of the main pixel electrode MPE and the secondary pixel electrode SPE of each of the blue pixel units is greater than the gap width (S1, S2) between adjacent ones of the branch electrodes (B1, B2) of respective one of the main pixel electrode MPE and the secondary pixel electrode SPE of the each of the red pixel units and the green pixel units. Specifically, the gap width (S1, S2) between adjacent ones of the branch electrodes (B1, B2) of each of the pixel electrodes in each of the blue pixel units is greater than the width (S1, S2) between adjacent ones of the branch electrodes (B1, B2) of respective one of the pixel electrodes in each of the red pixel units and the green pixel units by 0.25 to 0.55 microns, e.g., 0.25 microns, 0.26 microns, 0.27 microns, 0.28 microns, 0.29 microns, 0.30 microns, 0.31 microns, 0.32 microns, 0.33 microns, 0.34 microns, 0.35 microns, 0.36 microns, 0.37 microns, 0.38 microns, 0.39 microns, 0.40 microns, 0.41 microns, 0.42 microns, 0.43 microns, 0.44 microns, 0.45 microns, 0.46 microns, 0.47 microns, 0.48 microns, 0.49 microns, 0.50 microns, 0.51 microns, 0.52 microns, 0.53 microns, 0.54 microns, or 0.55 microns. Alternatively, the gap width (S1, S2) between adjacent ones of the branch electrodes (B1, B2) of each of the pixel electrodes in each of the blue pixel units is greater than the width (S1, S2) between adjacent ones of the branch electrodes (B1, B2) of respective one of the pixel electrodes in each of the red pixel units and the green pixel units by 0.4 microns.

In the present embodiment, the width (L1, L2) of each of the branch electrodes (B1, B2) of each of the blue pixel units is narrower than that of each of the red and green pixel units by 0.25 to 0.55 microns, and the gap width (S1, S2) of each of the branch electrodes (B1, B2) of each of the blue pixel units are correspondingly increased by 0.25 to 0.55 microns, so that the electric field distribution of the blue pixel units, thereby reducing deviation of the gamma values of the blue pixel units at the side view angle and balancing the transmittance of light of different wavelengths at various view angles.

In each of the blue pixel units, the width (L1, L2) of each of the branch electrodes (B1, B2) of the four regions in the main pixel electrode MPE is the same, the gap width (S1, S2) between adjacent ones of the branch electrodes (B1, B2) is the same, the width (L1, L2) of each of the branch electrodes (B1, B2) of the four regions in the secondary pixel electrode SPE is the same, and the gap width (S1, S2) between adjacent ones of the branch electrodes (B1, B2) is the same. However, the width (L1, L2) of each of the branch electrodes (B1, B2) of the four regions in the main pixel electrode MPE is different from the width (L1, L2) of each of the branch electrodes (B1, B2) of the four regions in the secondary pixel electrode SPE, and the gap width (S1, S2) between adjacent ones of the branch electrodes (B1, B2) of the four regions in the main pixel electrode MPE is different from the gap width (S1, S2) between adjacent ones of the branch electrodes (B1, B2) of the four regions in the secondary pixel electrode SPE.

Alternatively, the width of the each of the branch electrodes of the main pixel electrode MPE in each of the blue pixel units is 3.8 microns, and the gap width between adjacent ones of the branch electrodes (B1, B2) of the main pixel electrode MPE is 2.2 microns; the width of the each of the branch electrodes of the secondary pixel electrode SPE in each of the blue pixel units is 4 microns, and the gap width between adjacent ones of the branch electrodes (B1, B2) of the secondary pixel electrode SPE is 2 microns; and vice versa.

This asymmetric structure changes the electric field distribution inside the blue pixel units, so that the liquid crystal molecules exhibit different alignment states in different regions and balances the optical characteristics of the blue pixel units, the red pixel units, and the green pixel units at different view angles while the width (L1, L2) of each of the branch electrodes (B1, B2) of the main pixel electrode MPE of each of the blue pixel units and the gap width (S1, S2) between adjacent ones of the branch electrodes (B1, B2) of the main pixel electrode MPE thereof are different from those of the secondary pixel electrode SPE of the each of the blue pixel units, respectively, thereby taking into account improvement of the color shift.

Structures of the main pixel electrode MPE and the secondary pixel electrode SPE of the red, green, and blue pixel units are differentiated in the present embodiment, thereby effectively improving the display effect, especially the color uniformity when viewing at a side view angle.

The liquid crystal display device provided in yet another embodiment of the present disclosure is similar to the liquid crystal display device provided in the previously provided embodiments, except that: for the main pixel electrode MPE of each of the blue pixel units, the width (L1, L2) of each of the branch electrodes (B1, B2) of the first region (MR1) and the third region (MR3) is less than the width (L1, L2) of each of the branch electrodes (B1, B2) of the main pixel electrode MPE of each of the red pixel units and the green pixel units, and the gap width (S1, S2) between adjacent ones of the branch electrodes (B1, B2) of the first region (MR1) and the third region (MR3) is greater than the gap width (S1, S2) between adjacent ones of the branch electrodes (B1, B2) of the main pixel electrode MPE of each of the red pixel units and the green pixel units; and the width (L1, L2) of each of the branch electrodes (B1, B2) of the second region (MR2) and the fourth region (MR4) is equal to the width (L1, L2) of each of the branch electrodes (B1, B2) of the main pixel electrode MPE of each of the red pixel units and the green pixel units, and the gap width (S1, S2) between adjacent ones of the branch electrodes (B1, B2) of the second region (MR2) and the fourth region (MR4) is equal to the gap width (S1, S2) between adjacent ones of the branch electrodes (B1, B2) of the main pixel electrode MPE of each of the red pixel units and the green pixel units.

for the secondary pixel electrode SPE of each of the blue pixel units, the width (L1, L2) of each of the branch electrodes (B1, B2) of the first region (SR1) and the third region (SR3) is less than the width (L1, L2) of each of the branch electrodes (B1, B2) of the secondary pixel electrode SPE of each of the red pixel units and the green pixel units, and the gap width (S1, S2) between adjacent ones of the branch electrodes (B1, B2) of the first region (SR1) and the third region (SR3) is greater than the gap width (S1, S2) between adjacent ones of the branch electrodes (B1, B2) of the secondary pixel electrode SPE of each of the red pixel units and the green pixel units; and the width (L1, L2) of each of the branch electrodes (B1, B2) of the second region (SR2) and the fourth region (SR4) is equal to the width (L1, L2) of each of the branch electrodes (B1, B2) of the secondary pixel electrode SPE of each of the red pixel units and the green pixel units, and the gap width (S1, S2) between adjacent ones of the branch electrodes (B1, B2) of the second region (SR2) and the fourth region (SR4) is equal to the gap width (S1, S2) between adjacent ones of the branch electrodes (B1, B2) of the secondary pixel electrode SPE of each of the red pixel units and the green pixel units.

In the main pixel electrode MPE of the each of the blue pixel units, the width (L1, L2) of each of the branch electrodes (B1, B2) of the first region (MR1) and the third region (MR3) is the same and the gap width (S1, S2) between adjacent ones of the branch electrodes (B1, B2) of the first region (MR1) and the third region (MR3) is the same, and the width (L1, L2) of each of the branch electrodes (B1, B2) of the second region (MR2) and the fourth region (MR4) is the same and the gap width (S1, S2) between adjacent ones of the branch electrodes (B1, B2) of the second region (MR2) and the fourth region (MR4) is the same. the width (L1, L2) of each of the branch electrodes (B1, B2) of the first region (MR1) is less than the width (L1, L2) of each of the branch electrodes (B1, B2) of the second region (MR2), and the gap width (S1, S2) between adjacent ones of the branch electrodes (B1, B2) of the first region (MR1) is greater than the gap width (S1, S2) between adjacent ones of the branch electrodes (B1, B2) of the second region (MR2).

A structure of the secondary pixel electrode SPE of each of the blue pixel units is the same as that of the main pixel electrode MPE of the each of the blue pixel units.

This multi-region differentiation structure can further improve a display effect in a side view angle while maintaining the display quality in the front view angle. Two diagonal regions of each of the blue pixel units employ a narrower branch electrode (B1, B2) and a wider gap between adjacent branch electrodes (B1, B2), while another two regions of the blue pixel unit maintain the same width of each of the branch electrode (B1, B2) and the same gap width between adjacent branch electrodes (B1, B2) as those of the red and green pixel units. This asymmetric structure can more finely adjust the optical characteristics of the blue pixel units at different view angles, thereby further improving the color uniformity at the side view angle.

The liquid crystal display device provided in yet another embodiment of the present disclosure is similar to the liquid crystal display device provided in the previously provided embodiments, except that: for the main pixel electrode MPE of each of the blue pixel units, the width (L1, L2) of each of the branch electrodes (B1, B2) of the first region (MR1) and the second region (MR2) is less than the width (L1, L2) of each of the branch electrodes (B1, B2) of the main pixel electrode MPE of each of the red pixel units and the green pixel units, and the gap width (S1, S2) between adjacent ones of the branch electrodes (B1, B2) of the first region (MR1) and the second region (MR2) is greater than the gap width (S1, S2) between adjacent ones of the branch electrodes (B1, B2) of the main pixel electrode MPE of each of the red pixel units and the green pixel units; and the width (L1, L2) of each of the branch electrodes (B1, B2) of the third region (MR3) and the fourth region (MR4) is equal to the width (L1, L2) of each of the branch electrodes (B1, B2) of the main pixel electrode MPE of each of the red pixel units and the green pixel units, and the gap width (S1, S2) between adjacent ones of the branch electrodes (B1, B2) of the third region (MR3) and the fourth region (MR4) is equal to the gap width (S1, S2) between adjacent ones of the branch electrodes (B1, B2) of the main pixel electrode MPE of each of the red pixel units and the green pixel units.

for the secondary pixel electrode SPE of each of the blue pixel units, the width (L1, L2) of each of the branch electrodes (B1, B2) of the first region (SR1) and the second region (SR2) is less than the width (L1, L2) of each of the branch electrodes (B1, B2) of the secondary pixel electrode SPE of each of the red pixel units and the green pixel units, and the gap width (S1, S2) between adjacent ones of the branch electrodes (B1, B2) of the first region (SR1) and the second region (SR2) is greater than the gap width (S1, S2) between adjacent ones of the branch electrodes (B1, B2) of the secondary pixel electrode SPE of each of the red pixel units and the green pixel units; and the width (L1, L2) of each of the branch electrodes (B1, B2) of the third region (SR3) and the fourth region (SR4) is equal to the width (L1, L2) of each of the branch electrodes (B1, B2) of the secondary pixel electrode SPE of each of the red pixel units and the green pixel units, and the gap width (S1, S2) between adjacent ones of the branch electrodes (B1, B2) of the third region (SR3) and the fourth region (SR4) is equal to the gap width (S1, S2) between adjacent ones of the branch electrodes (B1, B2) of the secondary pixel electrode SPE of each of the red pixel units and the green pixel units.

In the main pixel electrode MPE of the each of the blue pixel units, the width (L1, L2) of each of the branch electrodes (B1, B2) of the first region (MR1) and the second region (MR2) is the same and the gap width (S1, S2) between adjacent ones of the branch electrodes (B1, B2) of the first region (MR1) and the second region (MR2) is the same, and the width (L1, L2) of each of the branch electrodes (B1, B2) of the third region (MR3) and the fourth region (MR4) is the same and the gap width (S1, S2) between adjacent ones of the branch electrodes (B1, B2) of the third region (MR3) and the fourth region (MR4) is the same. The width (L1, L2) of each of the branch electrodes (B1, B2) of the first region (MR1) is less than the width (L1, L2) of each of the branch electrodes (B1, B2) of the third region (MR3), and the gap width (S1, S2) between adjacent ones of the branch electrodes (B1, B2) of the first region (MR1) is greater than the gap width (S1, S2) between adjacent ones of the branch electrodes (B1, B2) of the third region (MR3).

A structure of the secondary pixel electrode SPE of each of the blue pixel units is the same as that of the main pixel electrode MPE of the each of the blue pixel units.

In the present embodiment, the structure of each of the blue pixel units is an axisymmetric dual-region differential structure with a symmetry axis being a trunk electrode (T1, T2). This technical solution can enable the blue pixel units to have more balanced optical characteristics at different view angles, thereby further improving the color uniformity at the side view angle. Meanwhile, since a structure of a portion of the regions of the blue pixel unit is the same as that of each of the red and green pixel units, the display quality in the front view angle can be maintained to a certain extent.

Such an axisymmetric dual-region differential structure can more finely adjust the optical characteristics of the blue pixel units at different view angles, particularly the view angle characteristics in the horizontal and vertical directions, thereby further improving the color uniformity at the side view angle while maintaining good display quality in the front view angle.

The liquid crystal display device provided in yet another embodiment of the present disclosure is similar to the liquid crystal display device provided in the previously provided embodiments, except that: for the main pixel electrode MPE of each of the blue pixel units, there are two following structures:

a first structure: the width (L1, L2) of each of the branch electrodes (B1, B2) of the first region (MR1), the second region (MR2), and the third region (MR3) is less than the width (L1, L2) of each of the branch electrodes (B1, B2) of the main pixel electrode MPE of each of the red pixel units and the green pixel units, and correspondingly the gap width (S1, S2) between adjacent ones of the branch electrodes (B1, B2) of the first region (MR1), the second region (MR2), and the third region (MR3) is greater than the gap width (S1, S2) between adjacent ones of the branch electrodes (B1, B2) of the main pixel electrode MPE of each of the red pixel units and the green pixel units; and the width (L1, L2) of each of the branch electrodes (B1, B2) of the fourth region (MR4) is equal to the width (L1, L2) of each of the branch electrodes (B1, B2) of the main pixel electrode MPE of each of the red pixel units and the green pixel units, and correspondingly the gap width (S1, S2) between adjacent ones of the branch electrodes (B1, B2) of the fourth region (MR4) is equal to the gap width (S1, S2) between adjacent ones of the branch electrodes (B1, B2) of the main pixel electrode MPE of each of the red pixel units and the green pixel units.

a second structure: the width (L1, L2) of each of the branch electrodes (B1, B2) of the first region (MR1), the second region (MR2), and the third region (MR3) is equal to the width (L1, L2) of each of the branch electrodes (B1, B2) of the main pixel electrode MPE of each of the red pixel units and the green pixel units, and correspondingly the gap width (S1, S2) between adjacent ones of the branch electrodes (B1, B2) of the first region (MR1), the second region (MR2), and the third region (MR3) is equal to the gap width (S1, S2) between adjacent ones of the branch electrodes (B1, B2) of the main pixel electrode MPE of each of the red pixel units and the green pixel units; and the width (L1, L2) of each of the branch electrodes (B1, B2) of the fourth region (MR4) is less than the width (L1, L2) of each of the branch electrodes (B1, B2) of the main pixel electrode MPE of each of the red pixel units and the green pixel units, and correspondingly the gap width (S1, S2) between adjacent ones of the branch electrodes (B1, B2) of the fourth region (MR4) is greater than the gap width (S1, S2) between adjacent ones of the branch electrodes (B1, B2) of the main pixel electrode MPE of each of the red pixel units and the green pixel units.

A structure of the secondary pixel electrode SPE of each of the blue pixel units is the same as that of the main pixel electrode MPE of the each of the blue pixel units.

In the main pixel electrode MPE and the secondary pixel electrode SPE of each of the blue pixel units, the width (L1, L2) of each of the branch electrodes (B1, B2) of the first region (MR1, SR1), the second region (MR2, SR2), and the third region (MR3, SR3) is the same and the gap width (S1, S2) between the adjacent branch electrodes (B1, B2) of the first region (MR1, SR1), the second region (MR2, SR2), and the third region (MR3, SR3) is the same.

This asymmetric region differential structure can further reduce the gamma curve of the blue pixel unit in the side view angle in a larger gray scale range, so that the brightness of the blue pixel unit in the side angle in the larger gray scale range is close to that of each of the red and green pixel units, thereby improving the overall view angle consistency. Meanwhile, since a structure of one region of the blue pixel unit is the same as that of each of the red and green pixel units, the display quality in the front view angle can be maintained to a certain extent.

By introducing a more complex asymmetric structure in the main pixel electrode MPE and the secondary pixel electrode SPE of the blue pixel unit, the technical solution can more finely adjust the optical characteristics of the blue pixel unit at different view angles, especially to improve the color uniformity in a larger view angle range. This structure can significantly improve the display effect at the side view angle, particularly to suppress the blue shift, while maintaining good display quality in the front view angle.

The liquid crystal display device provided in the embodiment of the present disclosure effectively improves view angle performance of the liquid crystal display device in the vertical alignment mode by differentiating the width of each of the branch electrodes of the main pixel electrode of each of the red, green and blue pixel units and the gap width between adjacent ones of branch electrodes thereof from those of the secondary pixel electrode of each of the red, green and blue pixel units. Specifically, for the red and green pixel units, the width of the each of the branch electrodes of the main pixel electrode and the gap width between adjacent ones of the branch electrodes of the main pixel electrode are different from those of the secondary pixel electrode. This solution enables the main pixel electrode to generate a more uniform weak electric field in the low gray scale range, so as to facilitate the slow inversion of the liquid crystal molecules, and achieve a finer low gray scale control. In the medium gray scale range and the high gray scale range, the wider branch electrode and the narrower gap of between adjacent branch electrode of the secondary pixel electrode can generate a stronger electric field, so as to provide a higher brightness output. For the blue pixel unit, the width of each of the branch electrodes of the main pixel electrode and the secondary pixel electrode is less than the width of each of the branch electrodes of respective electrode of each of the red and green pixel units, and the gap width between adjacent ones of the branch electrodes of the main pixel electrode and the secondary pixel electrode is greater than the gap width between adjacent ones of the branch electrodes of respective electrode of the main pixel electrode and the secondary pixel electrode of each of the red and green pixel units, thereby effectively reducing and making the gamma values of the blue pixels in the low gray scale range and the medium gray scale range be closer to those of the red and green pixels and further improving the color uniformity at the side view angle.

In summary, the liquid crystal display device provided according to the present disclosure achieves more accurate display control at different gray scales and view angles, effectively improves the color uniformity at the side view angle, and in particular suppresses the common blue shift at the side view angle, while maintaining high transmittance.

The embodiments of the present disclosure have been described in detail above, and the contents of this specification should not be construed as limiting the scope of protection of the present disclosure.

What is claimed is:

1. A liquid crystal display device, comprising: a plurality of pixel units comprising red pixel units, green pixel units, and blue pixel units;

wherein each of the red pixel units, the green pixel units, and the blue pixel units comprises a main pixel electrode and a secondary pixel electrode, and the main pixel electrode and the secondary pixel electrode both comprise a plurality of branch electrodes;

a width of each of the branch electrodes of one of the main pixel electrode and the secondary pixel electrode of each of the red pixel units and the green pixel units is less than a width of each of the branch electrodes of another of the main pixel electrode and the secondary pixel electrode of the each of the red pixel units and the green pixel units; and a width of each of the branch electrodes of one of the main pixel electrode and the secondary pixel electrode of each of the blue pixel units is less than the width of the each of the branch electrodes of the one of the main pixel electrode and the secondary pixel electrode of the each of the red pixel units and the green pixel units, and a width of each of the branch electrodes of another of the main pixel electrode and the secondary pixel electrode of the each of the blue pixel units is less than the width of the each of the branch electrodes of the another of the main pixel electrode and the secondary pixel electrode of the each of the red pixel units and the green pixel units.

2. The liquid crystal display device of claim 1, wherein a gap width between adjacent ones of the branch electrodes of one of the main pixel electrode and the secondary pixel electrode of each of the red pixel units is greater than a gap width between adjacent ones of the branch electrodes of another of the main pixel electrode and the secondary pixel electrode of the each of the red pixel units; and a gap width between adjacent ones of the branch electrodes of one of the main pixel electrode and the secondary pixel electrode of each of the green pixel units is greater than a gap width between adjacent ones of the branch electrodes of another of the main pixel electrode and the secondary pixel electrode of the each of the green pixel units.

3. The liquid crystal display device of claim 1, wherein a gap width between adjacent ones of the branch electrodes of the one of the main pixel electrode and the secondary pixel electrode of the each of the blue pixel units is greater than a gap width between adjacent ones of the branch electrodes of the one of the main pixel electrode and the secondary pixel electrode of the each of the red pixel units and the green pixel units.

4. The liquid crystal display device of claim 1, wherein a gap width between adjacent ones of the branch electrodes of the another of the main pixel electrode and the secondary pixel electrode of the each of the blue pixel units is greater than a gap width between adjacent ones of the branch electrodes of the another of the main pixel electrode and the secondary pixel electrode of the each of the red pixel units and the green pixel units.

5. The liquid crystal display device of claim 1, wherein a ratio of the width of the each of the branch electrodes of the one of the main pixel electrode and the secondary pixel electrode of the each of the red pixel units and the green pixel units to the gap width between the adjacent branch electrodes of the one of the main pixel electrode and the secondary pixel electrode of the each of the red pixel units and the green pixel units is in the range of 1.1:1 to 1.3:1.

6. The liquid crystal display device of claim 5, wherein a ratio of the width of the each of the branch electrodes of the one of the main pixel electrode and the secondary pixel electrode of the each of the red pixel units and the green pixel units to the gap width between the adjacent branch electrodes of the one of the main pixel electrode and the secondary pixel electrode of the each of the red pixel units and the green pixel units is 3.3:2.7.

7. The liquid crystal display device of claim 1, wherein a ratio of the width of the each of the branch electrodes of the one of the main pixel electrode and the secondary pixel electrode of the each of the blue pixel units to the gap width between the adjacent branch electrodes of the one of the main pixel electrode and the secondary pixel electrode of the each of the blue pixel units is in the range of 1:1.1 to 1:1.3.

8. The liquid crystal display device of claim 7, wherein a ratio of the width of the each of the branch electrodes of the one of the main pixel electrode and the secondary pixel electrode of the each of the blue pixel units to the gap width between the adjacent branch electrodes of the one of the main pixel electrode and the secondary pixel electrode of the each of the blue pixel units is 2.7:3.3.

9. The liquid crystal display device of claim 1, wherein a ratio of the width of the each of the branch electrodes of the another of the main pixel electrode and the secondary pixel electrode of the each of the red pixel units and the green pixel units to the gap width between the adjacent branch electrodes of the another of the main pixel electrode and the secondary pixel electrode of the each of the red pixel units and the green pixel units is in the range of 1.5:1 to 1.7:1.

10. The liquid crystal display device of claim 9, wherein a ratio of the width of the each of the branch electrodes of the another of the main pixel electrode and the secondary pixel electrode of the each of the red pixel units and the green pixel units to the gap width between the adjacent branch electrodes of the another of the main pixel electrode and the secondary pixel electrode of the each of the red pixel units and the green pixel units is 3.7:2.3.

11. The liquid crystal display device of claim 1, wherein a ratio of the width of the each of the branch electrodes of the another of the main pixel electrode and the secondary pixel electrode of the each of the blue pixel units to the gap width between the adjacent branch electrodes of the another of the main pixel electrode and the secondary pixel electrode of the each of the blue pixel units is in the range of 1:1 to 1:1.

12. The liquid crystal display device of claim 11, wherein a ratio of the width of the each of the branch electrodes of the another of the main pixel electrode and the secondary pixel electrode of the each of the blue pixel units to the gap width between the adjacent branch electrodes of the another of the main pixel electrode and the secondary pixel electrode of the each of the blue pixel units is 3.1:2.9.

13. The liquid crystal display device of claim 1, wherein a width of the each of the branch electrodes of each of the main pixel electrode and the secondary pixel electrode of each of the blue pixel units is less than a width of each of the branch electrodes of respective one of the main pixel electrode and the secondary pixel electrode of the each of the red pixel units and the green pixel units; and a gap width between adjacent ones of the branch electrodes of each of the main pixel electrode and the secondary pixel electrode of each of the blue pixel units is greater than a gap width between adjacent ones of the branch electrodes of respective one of the main pixel electrode and the secondary pixel electrode of the each of the red pixel units and the green pixel units.

14. The liquid crystal display device of claim 13, wherein, for the each of the blue pixel units, each of the branch electrodes of the main pixel electrode has the same width, the gap width between every two adjacent ones of the branch electrodes of the main pixel electrode is the same, each of the branch electrodes of the secondary pixel electrode has the same width, the gap width between every two adjacent ones of the branch electrodes of the main pixel electrode is the same, the width of the each of the branch electrodes of the main pixel electrode is different from the width of the each of the branch electrodes of the secondary pixel electrode, and the gap width between the every two adjacent ones of the branch electrodes of the main pixel electrode is different from the gap width between the every two adjacent ones of the branch electrodes of the secondary pixel electrode.

15. The liquid crystal display device of claim 1, wherein each of the main pixel electrode and the secondary pixel electrode of the each of the red pixel units, the green pixel units, and the blue pixel units comprises a first region, a second region, a third region, and a fourth region, for the main pixel electrode of each of the blue pixel units, the width of each of the branch electrodes of the first region and the third region is less than the width of each of the branch electrodes of the main pixel electrode of each of the red pixel units and the green pixel units, the gap width between adjacent ones of the branch electrodes of the first region and the third region is greater than the gap width between adjacent ones of the branch electrodes of the main pixel electrode of each of the red pixel units and the green pixel units, the width of each of the branch electrodes of the second region and the fourth region is equal to the width of each of the branch electrodes of the main pixel electrode of each of the red pixel units and the green pixel units, and the gap width between adjacent ones of the branch electrodes of the second region and the fourth region is equal to the gap width between adjacent ones of the branch electrodes of the main pixel electrode of each of the red pixel units and the green pixel units; and for the secondary pixel electrode of the each of the blue pixel units, the width of each of the branch electrodes of the first region and the third region is less than the width of each of the branch electrodes of the secondary pixel electrode of each of the red pixel units and the green pixel units, the gap width between adjacent ones of the branch electrodes of the first region and the third region is greater than the gap width between adjacent ones of the branch electrodes of the secondary pixel electrode of each of the red pixel units and the green pixel units, the width of each of the branch electrodes of the second region and the fourth region is equal to the width of each of the branch electrodes of the secondary pixel electrode of each of the red pixel units and the green pixel units, and the gap width between adjacent ones of the branch electrodes of the second region and the fourth region is equal to the gap width between adjacent ones of the branch electrodes of the secondary pixel electrode of each of the red pixel units and the green pixel units.

16. The liquid crystal display device of claim 15, wherein, in the main pixel electrode of the each of the blue pixel units, each of the branch electrodes of the first region and the third region has the same width and the gap width between every two adjacent ones of the branch electrodes of the first region and the third region is the same, each of the branch electrodes of the second region and the fourth region has the same width and the gap width between every two adjacent ones of the branch electrodes of the second region and the fourth region is the same, the width of each of the branch electrodes of the first region is less than the width of each of the branch electrodes of the second region, and the gap width between adjacent ones of the branch electrodes of the first region is greater than the gap width between adjacent ones of the branch electrodes of the second region.

17. The liquid crystal display device of claim 1, wherein each of the main pixel electrode and the secondary pixel electrode of the each of the red pixel units, the green pixel units, and the blue pixel units comprises a first region, a second region, a third region, and a fourth region, for the main pixel electrode of each of the blue pixel units, the width of each of the branch electrodes of the first region and the second region is less than the width of each of the branch electrodes of the main pixel electrode of each of the red pixel units and the green pixel units, the gap width between adjacent ones of the branch electrodes of the first region and the second region is greater than the gap width between adjacent ones of the branch electrodes of the main pixel electrode of each of the red pixel units and the green pixel units, the width of each of the branch electrodes of the third region and the fourth region is equal to the width of each of the branch electrodes of the main pixel electrode of each of the red pixel units and the green pixel units, and the gap width between adjacent ones of the branch electrodes of the third region and the fourth region is equal to the gap width between adjacent ones of the branch electrodes of the main pixel electrode of each of the red pixel units and the green pixel units; and for the secondary pixel electrode of the each of the blue pixel units, the width of each of the branch electrodes of the first region and the second region is less than the width of each of the branch electrodes of the secondary pixel electrode of each of the red pixel units and the green pixel units, the gap width between adjacent ones of the branch electrodes of the first region and the second region is greater than the gap width between adjacent ones of the branch electrodes of the secondary pixel electrode of each of the red pixel units and the green pixel units, the width of each of the branch electrodes of the third region and the fourth region is equal to the width of each of the branch electrodes of the secondary pixel electrode of each of the red pixel units and the green pixel units, and the gap width between adjacent ones of the branch electrodes of the third region and the fourth region is equal to the gap width between adjacent ones of the branch electrodes of the secondary pixel electrode of each of the red pixel units and the green pixel units.

18. The liquid crystal display device of claim 17, wherein, in the main pixel electrode of the each of the blue pixel units, each of the branch electrodes of the first region and the second region has the same width, the gap width between every two adjacent ones of the branch electrodes of the first region and the second region is the same, each of the branch electrodes of the third region and the fourth region has the same width, the gap width between adjacent ones of the branch electrodes of the third region and the fourth region is the same, the width of each of the branch electrodes of the first region is less than the width of each of the branch electrodes of the third region, and the gap width between adjacent ones of the branch electrodes of the first region is greater than the gap width between adjacent ones of the branch electrodes of the third region.

19. The liquid crystal display device of claim 1, wherein each of the main pixel electrode and the secondary pixel electrode of the each of the red pixel units, the green pixel units, and the blue pixel units comprises a first region, a second region, a third region, and a fourth region, for the main pixel electrode of each of the blue pixel units, the width of each of the branch electrodes of the first region, the second region, and the third region is less than the width of each of the branch electrodes of the main pixel electrode of each of the red pixel units and the green pixel units, the gap width between adjacent ones of the branch electrodes of the first region, the second region, and the third region is greater than the gap width between adjacent ones of the branch electrodes of the main pixel electrode of each of the red pixel units and the green pixel units, the width of each of the branch electrodes of the fourth region is equal to the width of each of the branch electrodes of the main pixel electrode of each of the red pixel units and the green pixel units, and the gap width between adjacent ones of the branch electrodes of the fourth region is equal to the gap width between adjacent ones of the branch electrodes of the main pixel electrode of each of the red pixel units and the green pixel units; and the secondary pixel electrode of each of the blue pixel units has the same structure as the main pixel electrode of the blue pixel unit.

20. The liquid crystal display device of claim 1, wherein each of the main pixel electrode and the secondary pixel electrode of the each of the red pixel units, the green pixel units, and the blue pixel units comprises a first region, a second region, a third region, and a fourth region, for the main pixel electrode of each of the blue pixel units, the width of each of the branch electrodes of the first region, the second region, and the third region is equal to the width of each of the branch electrodes of the main pixel electrode of each of the red pixel units and the green pixel units, the gap width between adjacent ones of the branch electrodes of the first region, the second region, and the third region is equal to the gap width between adjacent ones of the branch electrodes of the main pixel electrode of each of the red pixel units and the green pixel units, the width of each of the branch electrodes of the fourth region is less than the width of each of the branch electrodes of the main pixel electrode of each of the red pixel units and the green pixel units, and the gap width between adjacent ones of the branch electrodes of the fourth region is greater than the gap width between adjacent ones of the branch electrodes of the main pixel electrode of each of the red pixel units and the green pixel units; and the secondary pixel electrode of each of the blue pixel units has the same structure as the main pixel electrode of the blue pixel unit.

* * * * *